B. STEVENS.
TRANSMISSION.
APPLICATION FILED MAR. 28, 1917.
1,242,618.
Patented Oct. 9, 1917.
2 SHEETS—SHEET 1.
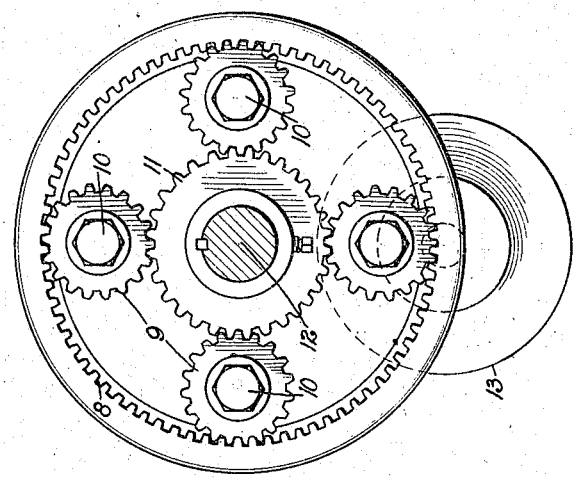
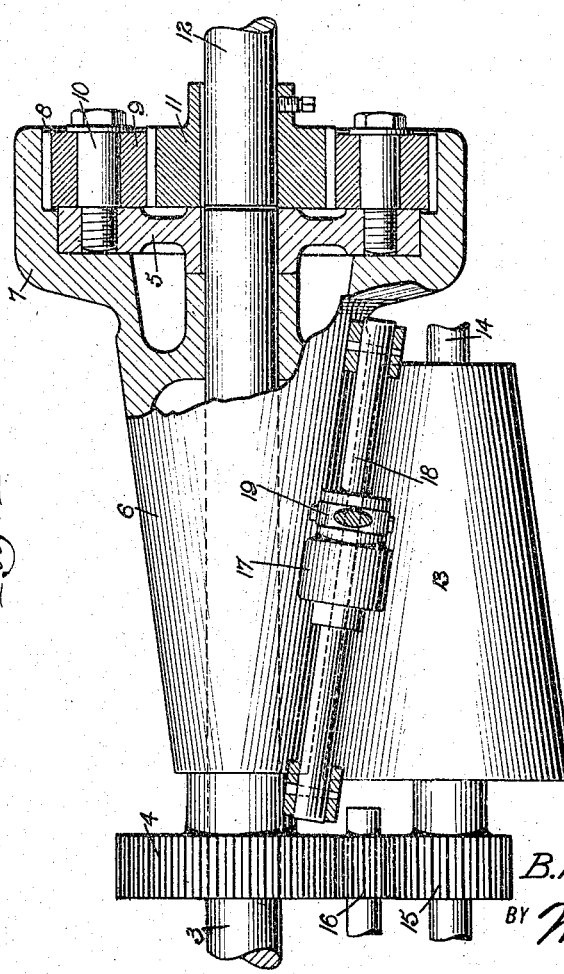

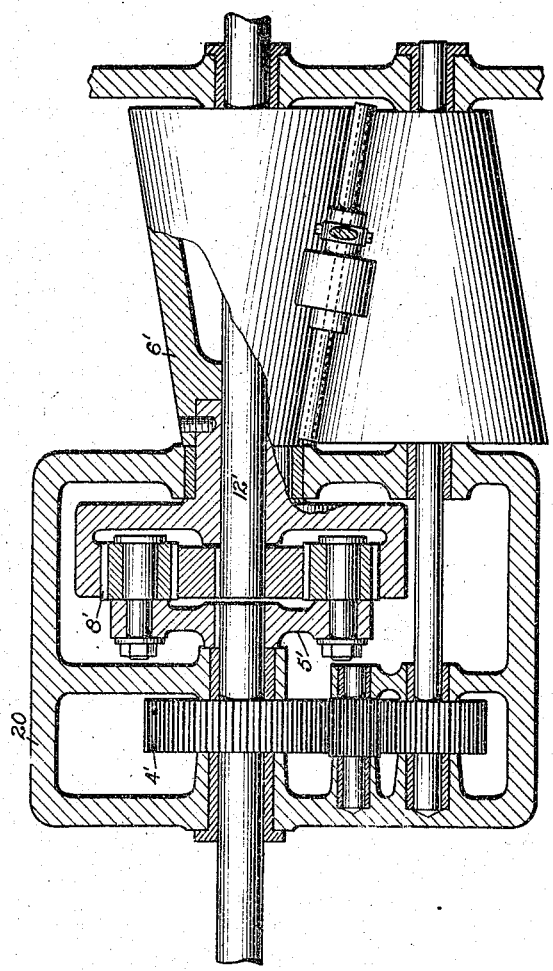

United States Patent Office.

BYRON STEVENS, OF OAKLAND, CALIFORNIA.

TRANSMISSION.

1,242,618.
Specification of Letters Patent.
Patented Oct. 9, 1917.

Application filed March 28, 1917. Serial No. 157,938.

*To all whom it may concern:*

Be it known that I, BYRON STEVENS, a citizen of the United States, and a resident of Oakland, in the county of Alameda and State of California, have invented a new and Improved Transmission, of which the following is a full, clear, and exact description.

The invention relates to transmission mechanisms of the frictional type coupled with a planetary gear system.

An object of the invention is to provide a simple, efficient and strong transmission through which power can be transmitted at variable speeds.

I attain this and other objects of my invention by the structure conventionally disclosed in the accompanying drawings, wherein similar characters of reference indicate corresponding parts in both views.

Figure 1 is an elevation of a transmission embodying my invention, a portion of the structure being broken out to show the details of construction;

Fig. 2 is an end elevation, and

Fig. 3 is a vertical section, partly in elevation, of a modified structure of my transmission.

Referring to the drawings, 3 is the driving shaft with which a gear 4 is constrained to rotate, also a plate or disk 5 spaced from the gear 4. Revolubly mounted on the shaft between the gear and disk is a friction cone 6 provided with a head 7 which houses the disk and presents in front of the disk a dented surface forming an interior gear 8. Pinions 9 in mesh with the interior gear 8 are revoluble on studs 10 carried by the disk 5. A gear 11 meshes with the pinions 9 and is keyed to a driven shaft 12 alining with the shaft 3.

A friction cone 13 similar to the cone 6 is mounted to revolve on a shaft 14 disposed parallelly to the shaft 3, said cone 13 tapering in a direction opposite to that of cone 6. In consequence, the facing portions of the cone surfaces are parallel to each other. A gear 15 is constrained to revolve with the cone 13. It meshes with a pinion 16 which is in mesh with the gear 4. A friction roller 17 engages the friction cones 6 and 13, whereby motion is transmitted from the friction cone 13 to the friction cone 6. The roller 17 is supported by a rod 18 on which the roller is free to revolve and whereon the roller can be moved longitudinally through the medium of a yoke 19, and, in consequence, the speed of the transmission varied. By a proper ratio of the planetary gears, reverse and forward speeds may be obtained.

In the modified structure the disk 5' is in proximity to the gear 4'. In consequence the interior gear 8' is at the narrower end of the cone 6' and is, therefore, revoluble on the driven shaft 12'. The arrangement shown in Fig. 3 permits the inclosure of all the gears in the same casing 20.

I claim:

1. A transmission comprising a driving member, a gear constrained to rotate therewith, a disk also constrained to revolve with the driving member and spaced from the gear, a friction cone revolubly mounted on the driving member and housing said disk, a second friction cone, a train of gears from the gear on the driving member to the second friction cone, a friction roller engaging the friction cone and mounted to slide longitudinally thereof, pinions revoluble on the disk in mesh with the first mentioned friction cone, and a driven member having a gear in mesh with the pinions.

2. A transmission comprising a driving member a gear constrained to revolve with the driving member, a disk also constrained to revolve with the driving member and spaced from the gear, a friction cone revoluble on the driving member between the disk and gear and housing said disk, said friction cone presenting an interiorly-dented surface in front of the disk, pinions revolubly mounted on the disk engaging the dented surface of the friction cone, a driven member, a gear constrained to rotate with the driven member in mesh with the pinions, a second friction cone directed oppositely to the first, gears coupling said second friction cone and the gear on the driving shaft, and a friction roller mounted to engage the two friction cones and slide longitudinally thereof, substantially as and for the purpose set forth.

3. A transmission comprising a driving and a driven member, a disk constrained to revolve with the driving member, pinions revoluble on the disk, a gear constrained to revolve with the driven member in mesh with the pinions, a friction cone, an interior gear in mesh with the pinions constrained to revolve with the cone, a second friction cone directed oppositely to the first, a train of gears for transmitting motion from the driving member to the second cone, and a friction roller interposed between the two friction cones.

BYRON STEVENS.